Sept. 23, 1947. A. E. W. JOHNSON 2,427,861
HARVESTER FOR CUTTING STANDING CORN STALKS AND REMOVING EARS THEREFROM
Filed Aug. 30, 1943 6 Sheets-Sheet 1
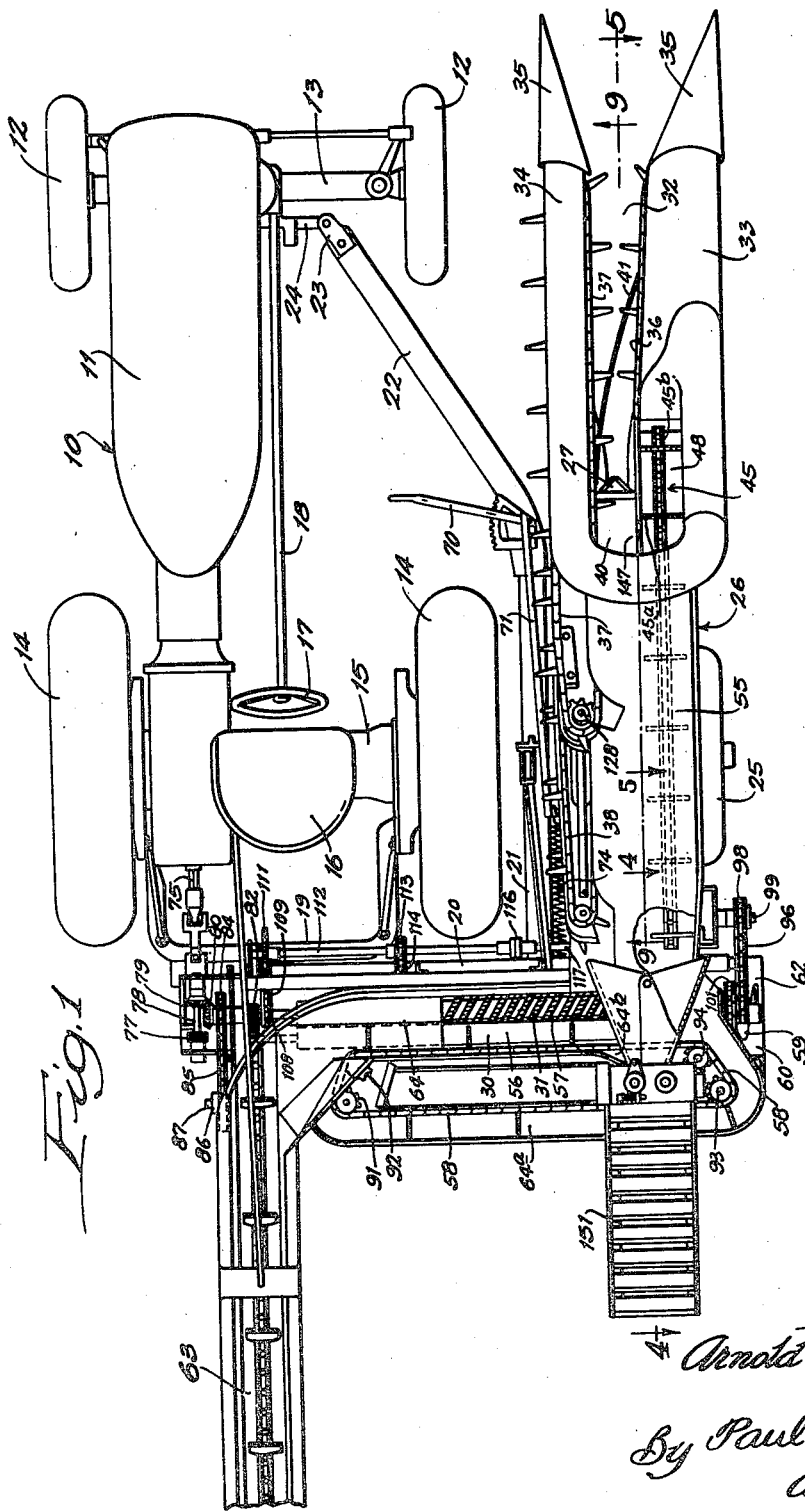
Inventor:
Arnold E. W. Johnson,
By Paul O. Pippel.
Attorney.

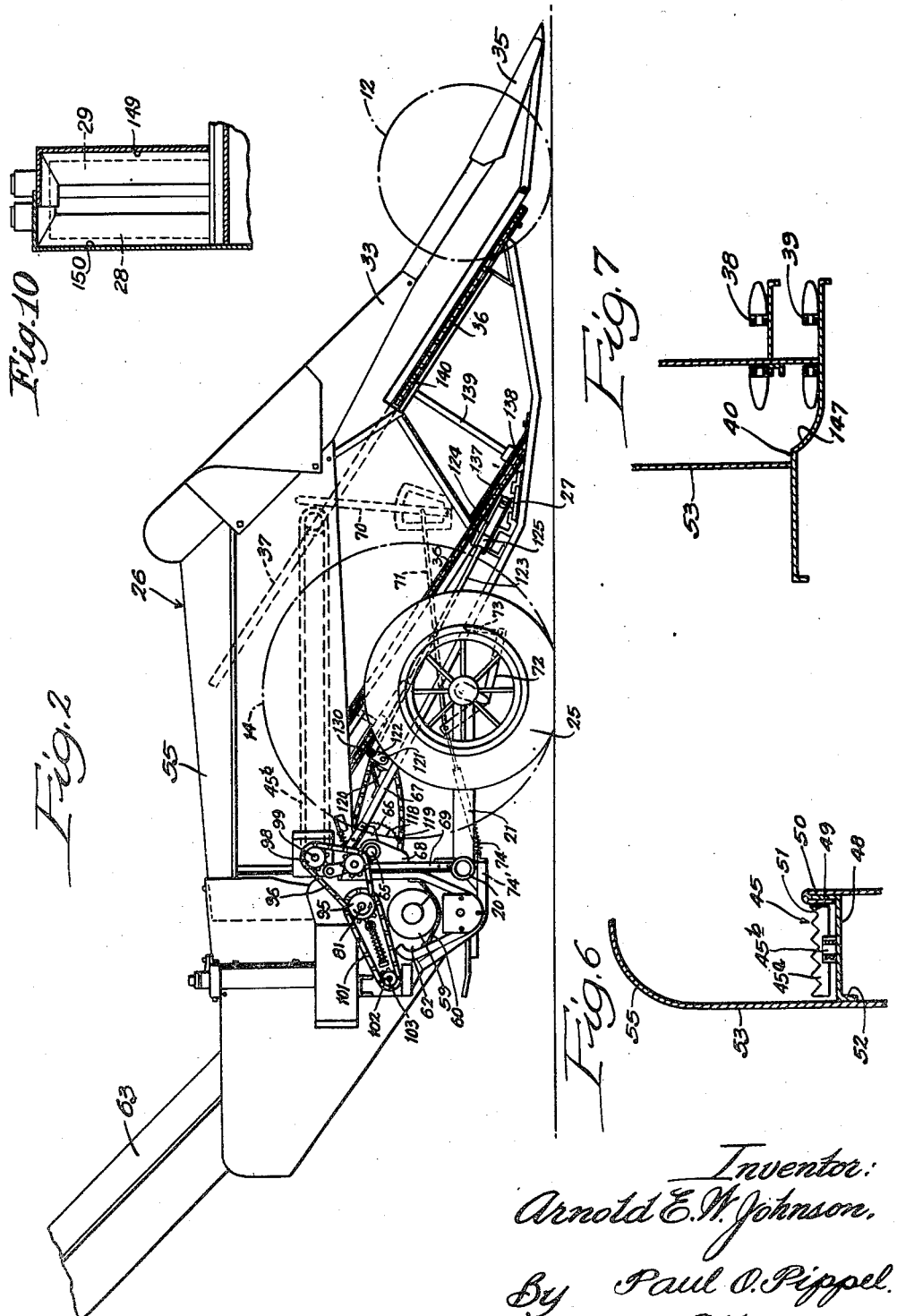

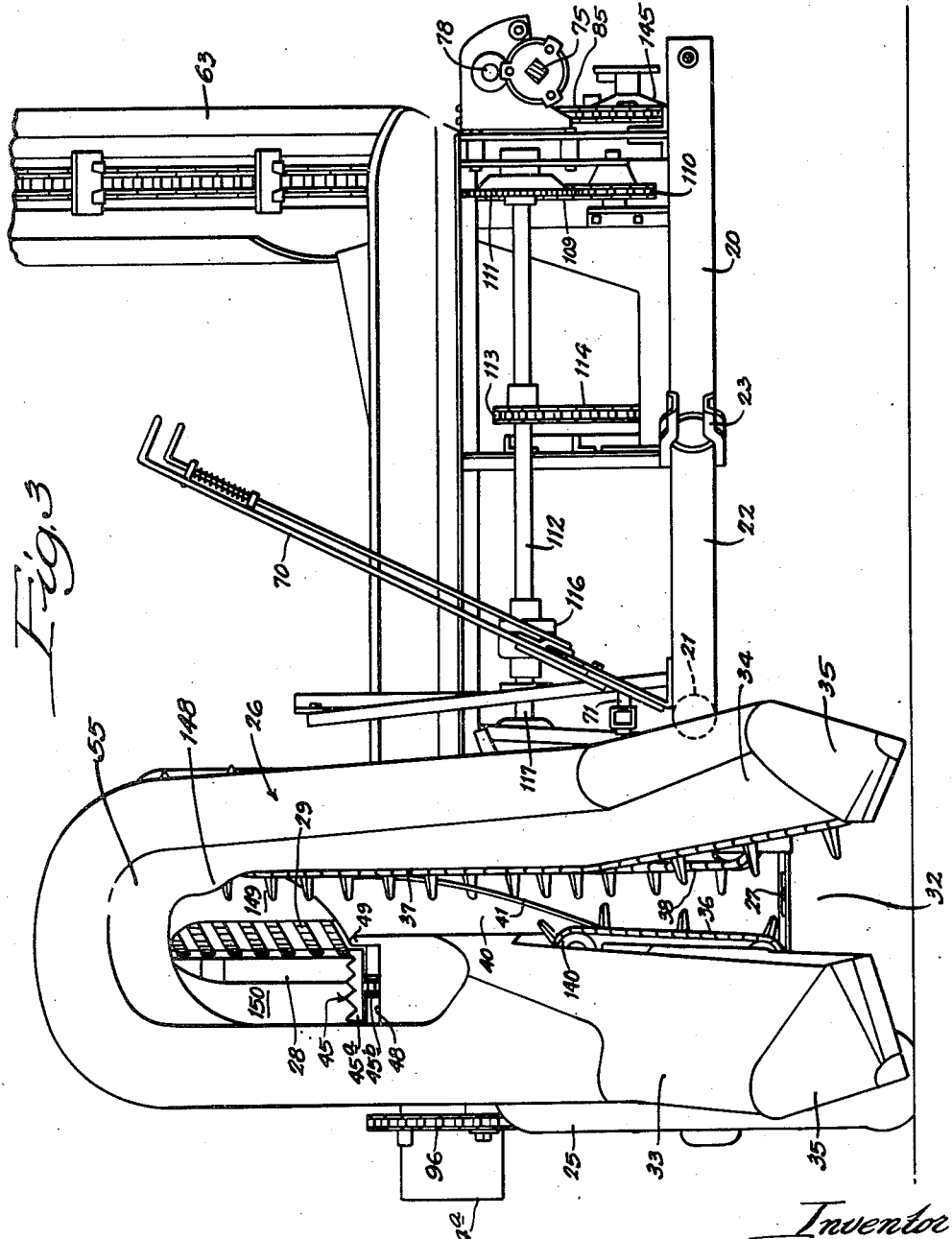

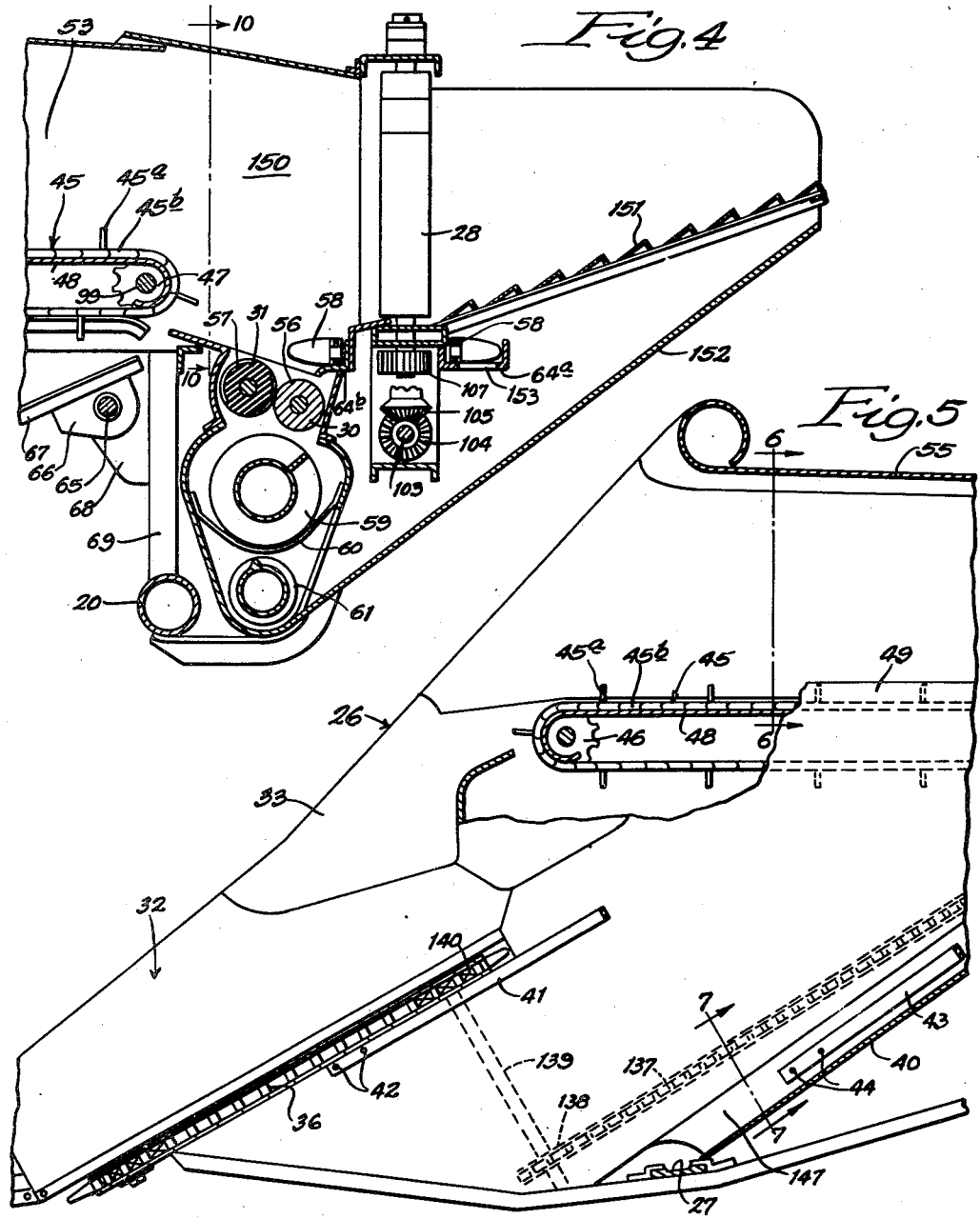

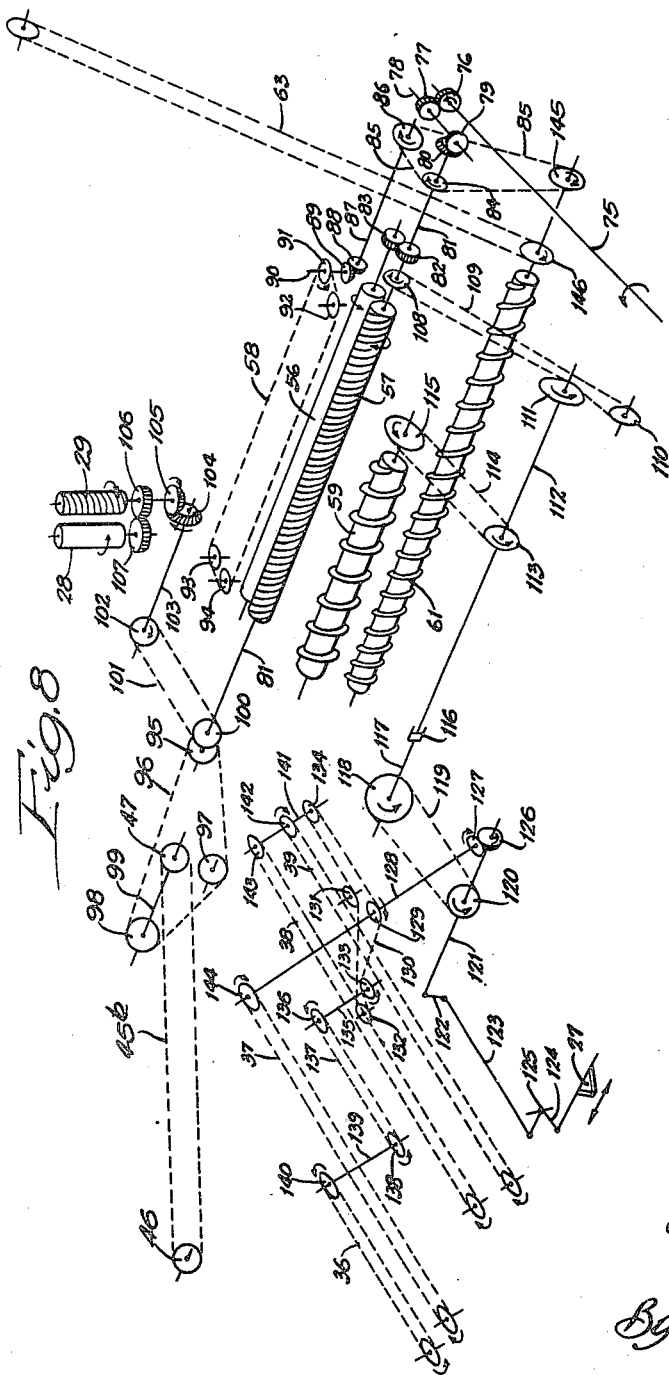

Sept. 23, 1947.  A. E. W. JOHNSON  2,427,861
HARVESTER FOR CUTTING STANDING CORN STALKS AND REMOVING EARS THEREFROM
Filed Aug. 30, 1943  6 Sheets-Sheet 6
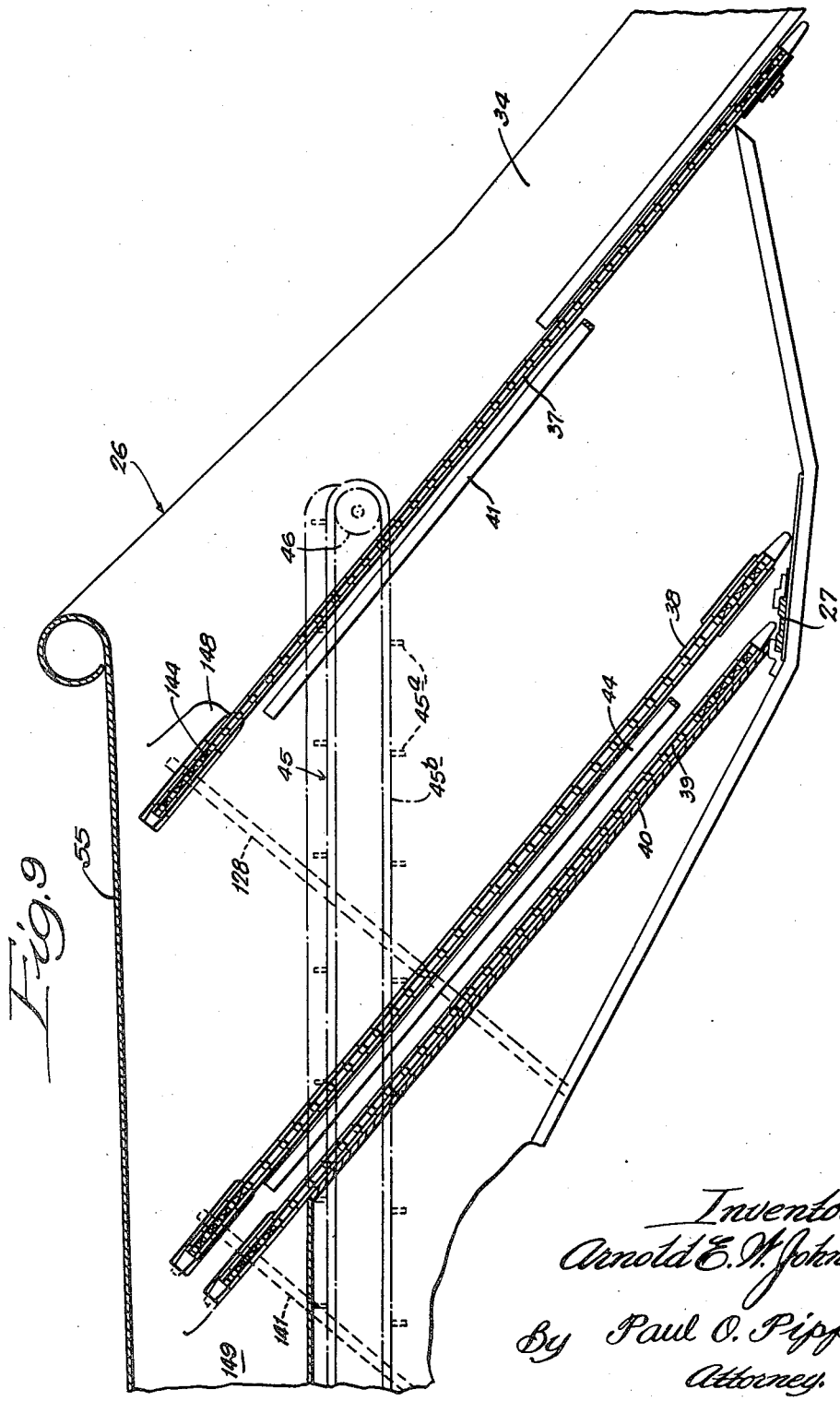

Patented Sept. 23, 1947

2,427,861

UNITED STATES PATENT OFFICE 2,427,861

HARVESTER FOR CUTTING STANDING CORNSTALKS AND REMOVING EARS THEREFROM

Arnold E. W. Johnson, Oak Park, Ill., assignor to International Harvester Company, a corporation of New Jersey Application August 30, 1943, Serial No. 500,487

32 Claims. (Cl. 56—15)

This invention relates to a harvester. More specifically it relates to a harvester of the type that cuts standing stalks and strips crops from the cut stalks.

The corn harvester in most general use today is one that removes ears from standing stalks. There are several very marked disadvantages in a picker of this type. In the first place, the rolls for removing the ears are long and consequently heavy. In the second place, they must be adjustably mounted to accommodate different conditions in corn, and, since the rolls are heavy, the mounting must be costly and involved. In the third place, the harvester will usually include beside the ear-removing rolls, large and heavy husking rolls that are generally somewhat spaced from the ear-removing rolls and thus require an involved mounting separate from that of the ear-removing rolls. In the fourth place, there is a considerable shelling of corn with rolls that remove ears directly from standing stalks, and the corn thus shelled is generally lost. The shelling may be quite high with certain types of hybrid corn now in use.

The various disadvantages just described are avoided in a properly designed machine of the type that cuts standing corn stalks and removes ears from the cut stalks. A machine of this type appears to have many obvious advantages, but in spite of this fact and the fact that prior patents show a machine of this type to be very old, this machine has not been widely used. It has apparently been difficult to handle the cut corn stalks between the stalk-cutting means and the ear-removing means and to effect a proper delivery to the latter means for efficient removal of the ears. Another difficulty apparently lies in the suitable arrangement of the machine in relation to a tractor.

The present application relates to the transferring of cut stalks from a means for cutting standing stalks to a means for stripping crops from the cut stalks. It also relates to the connection to a tractor of a device performing these operations as well as to the novel association of corn pickers in general with a tractor.

An object of the present invention is to provide an improved device for cutting standing stalks and stripping crops from the cut stalks.

A further object is the provision of improved conveying means for moving cut stalks from a cutting means to a stripping means.

Another object is to provide an improved conveying means for moving cut crops from a cutting means.

Still another object is the provision of improved conveying means for conveying cut stalks to a stripping means.

Another object is to provide an improved corn harvester that cuts standing corn stalks and strips corn ears from the cut stalks.

A further object is the provision of improved conveying means for feeding cut corn stalks from a corn stalk cutting means to a stripping means for removing corn ears from cut stalks.

A further object is to provide an improved conveying means for moving cut corn stalks to stripping means for removing corn ears from the cut corn stalks.

Another object is to provide an improved feeding means for conveying cut stalks from a cutting means to a crop-treating device.

Still another object is the provision of improved feeding means for cut crops.

A further object is to provide an improved arrangement of a tractor and a harvester connected thereto that cuts standing stalks and strips crops from the cut stalks.

A further object is the provision of an improved arrangement of a tractor and a harvester connected thereto for cutting standing stalks, stripping crops from the cut stalks, and husking the crops.

A still further object is to provide an improved arrangement of a tractor and a corn harvester connected thereto for cutting standing crops, removing corn ears from the cut stalks, and husking the ears.

Still another object is the provision of an improved arrangement of a tractor and of a corn harvester involving means for removing ears from corn stalks and means for husking the ears.

Another object is the provision of improvements in a harvester connected at the side of a tractor and supported partially on an auxiliary wheel for cutting standing stalks and stripping crops from the cut stalks.

Other objects will appear from the disclosure.

According to the present invention there is connected at the side of a tractor a harvester comprising cutting means positioned outside the tractor wheel line forward of the rear axle, feeding means extending rearwardly from the cutting means outside the wheel line to the rear of the rear axle, stripping means positioned outside of the wheel line and rearward of the axle, and husking means extending transversely of the tractor between the stripping means and the axle. The feeding means between the cutting means and the stripping means comprises a narrow throat provided with inclined conveying elements and a horizontal conveyor positioned alongside the narrow throat and adapted to feed over itself. The harvester is mounted on a framework supported in part upon the tractor and in part upon an auxiliary wheel. The cutting means and conveying means form a unit that is pivoted with respect to the framework, and the stripping means and husking means of a unit that is fixed against movement with respect to the framework.

In the drawings,

Figure 1 is a plan view of a tractor and a harvester of the type of the present invention connected to the tractor in the novel manner of the present invention;

Figure 2 is a side view of the harvester;

Figure 3 is a front view on an enlarged scale of the harvester;

Figure 4 is a sectional view on the same scale as Figure 3 taken on the line 4—4 of Figure 1;

Figure 5 is a partial section on the same enlarged scale as Figure 3 corresponding generally to sectional view taken on the line 5—5 of Figure 1;

Figure 6 is a sectional view taken on the line 6—6 of Figure 5;

Figure 7 is a sectional view taken on the line 7—7 of Figure 5;

Figure 8 is a schematic view of a perspective of the driving means of the harvesting means of the present invention;

Figure 9 is a partial section on the same enlarged scale as Figure 3 corresponding generally to a sectional view taken on the line 9—9 of Figure 1, the relative position of the horizontal conveyor of Figures 3 and 5 which is removed by this section being shown in broken lines; and Figure 10 is a section taken on the line 10—10 of Figure 4.

Reference character 10 designates a tractor having a body 11, front wheels 12, a front axle 13, rear wheels 14, and a rear axle 15. The tractor body 11 is offset with respect to a longitudinal center line of the tractor midway between the rear wheels 14. An operator's seat 16, steering wheel 17, and a steering column 18 are generally on the aforementioned longitudinal center line and are offset with respect to the body 11. The tractor 10 carries a U-shaped draw-bar 19 to the rear thereof. Connected to the side of the tractor 10 is a framework comprising essentially a transverse member 20 extending across the rear of the tractor and a longitudinal member 21 extending alongside and outwardly of one rear wheel 14 and having a diagonal forward portion 22 connected at 23 to a support 24 within the tractor wheel line and immediately rearward of the front axle 13. The transverse member 20 of the framework is pivotally connected to the U-shaped draw-bar 19 at a point, not shown, and this point and the point of connection 23 for the forward end of the longitudinal member 21 determine a generally longitudinal pivot axis for the framework with respect to the tractor 10. The framework is supported partially on the tractor 10 through the aforementioned points of connection and partially on a wheel 25 positioned somewhat outward of the longitudinal member 21 and connected thereto by means not fully shown. This framework and its connection to a tractor is claimed and more fully shown in Patent No. 2,358,513 issued September 19, 1944.

The framework formed of the transverse member 20 and the longitudinal member 21 supports a harvester indicated generally by the reference character 26. The harvester 26 comprises essentially a reciprocating stalk cutter 27, vertical snapping rolls 28 and 29 (Figures 3 and 4), and transverse husking rolls 30 and 31. The reciprocating cutter 27 is positioned at a mid-point near the bottom of a vertical throat 32 formed between a left side 33 and a right side 34. At the forward ends of the sides 33 and 34 are divider points 35. The left side 33 supports a short inclined gathering chain 36 and the right side 34, a long inclined gathering chain 37. As shown in Figure 9, there is positioned generally below the gathering chain 37 a pair of chains 38 and 39 extending upwardly and rearwardly from a point generally near the reciprocating cutter 27. Immediately below the lower chain 39 of the pair of lower chains is an inclined bottom 40. An upper spring strip 41 is secured at its lower end, as indicated at 42, to the left side 33 of the throat 32 immediately below the short inclined gathering chain 36 and is inclined upwardly and rearwardly, and extends across the throat 32 to the side 34 immediately adjacent the long gathering chain 37. A lower inclined spring strip 43 is secured to the side 33 of the throat 32 at 44 and extends across to the side 34 between the chains 38 and 39.

Alongside the upper end of the throat 32 is a horizontal conveyor 45 adapted to feed material over itself. As seen from Figures 4, 5, and 6, this conveyor comprises flights 45$^a$ and a sprocket chain 45$^b$ secured to the flights 45$^a$ and having the form of a loop engaging a sprocket 46 at its forward end and a sprocket 47 at its rearward end and passing over a sheet metal floor 48 immediately below its upper run. The floor 48 has one flanged side 49 fitted between a sheet 50 and a turned-back flange 51 thereon. The sheet 50 forms part of the left side 33 of the throat 32. The floor 48 also has a flanged side 52 secured to an outer wall 53 of the harvester 26. Figure 9 shows the horizontal conveyor in dash-dot lines against the conveying chains 37, 38, and 39, so that its relationship to these chains may be observed. It will be seen that the upper end of the chain 37 extends somewhat above the forward end of the horizontal conveyor 45 and that the upper ends of the chains 38 and 39 extend somewhat above the rearward portion of the horizontal conveyor 45. The right side of the throat 32 is extended upwardly and over the throat 32 and the horizontal conveyor 45, down to the wall 53 (Figure 6), so as to form a hood 55 over the throat 32 and conveyor 45.

As seen in Figure 4, the snapping rolls 28 and 29 are positioned somewhat rearward of the rear end of the horizontal conveyor 45, and between the conveyor 45 and the snapping rolls 28 and 29 are a smooth wooden husking roll 56 and a corrugated husking roll 57. A conveyor chain 58, formed in a loop, extends along the husking rolls 56 and 57 and is adapted to move corn ears along these rolls for husking. Positioned below the husking rolls 56 and 57, is an auger conveyor 59 for husks and, below the conveyor 59, are a grate 60 and an auger 61 for shelled corn. The auger conveyor 59 has an open end 62 at the outer side of the harvester 26, outward of and rearward of the auxiliary supporting wheel 25, from which the husks are to be discharged upon the ground. The auger conveyor 61 for shelled corn is adapted to move the shelled corn falling from the auger conveyor 59 through the grate 60 to a wagon elevator 63, which conveys shelled corn upwardly and rearwardly to a wagon, not shown. The wagon elevator 63 is also adapted to convey corn ears to a wagon from the husking rolls 30 and 31, the conveyor chain 58 moving the corn ears from the husking rolls over a plate 64 to the wagon elevator. The snapping rolls 28 and 29 are within and above the conveyor-chain loop 58. The chain loop 58 is supported in a trough-like structure 64a at its side to the rear of the snapping rolls and at its end just outward of the snapping rolls. The loop 58 is supported on a narrow shelf 64b at its side to the front of the snapping rolls.

The reciprocating cutter 27, the throat 32, the chains 36, 37, 38, and 39, and the horizontal conveyor 45 comprise a unit or part of the harvester 26 that pivots with respect to the framework formed by the members 20 and 21. The pivot axis is formed on a pin 65, which connects a bracket 66 secured to an under member 67 of the pivoted unit and a bracket 68 secured to an upright 69 extending upwardly from the transverse frame member 20. The pivoted unit or part of the harvester 26 is adjusted by means of a detent lever 70 mounted upon the longitudinal frame member 21. The lever 70 is connected with a link 71 connected in turn to one arm of a bell-crank 72. The other arm of the bell-crank 72 is connected by a link 73 to the under member 67 of the movable unit. A counterbalancing spring 74, connected to one arm of the bell-crank adjacent the connection of the link 71 thereto and to an angle member 74' fixed to and below the transverse member 20, serves to counterbalance the weight of the movable unit. The snapping rolls 28 and 29, the husking rolls 56 and 57, the auger 59 for husks, and the auger 61 for shelled corn comprise a unit or portion of the harvester 26 that is rigid with respect to the frame members 20 and 21 and has no movement relative thereto.

The drive of the various parts of the harvester 26 is shown schematically in perspective in Figure 8. A power take-off shaft 75 extends rearwardly from the rear end of the tractor and carries a spur gear 76 driving a spur gear 77 secured upon a counter-shaft 78. Also secured upon the counter-shaft 78 is a bevel gear 79 meshing with a bevel gear 80 secured to a shaft 81. The husking roll 57 is secured to the shaft 81, being driven thereby, and the other husking roll 56 is driven by the shaft 81 through a spur gear 82 secured to the shaft 81 and a spur gear 83 secured to the husking roll 56. A sprocket 84, secured to the shaft 81, drives a sprocket chain 85, in turn driving a sprocket 86 secured to a jack-shaft 87. The jack-shaft 87 has secured thereto a bevel gear 88 driving a bevel gear 89 secured to a short vertical shaft 90. To the vertical shaft 90 is secured a sprocket 91, which engages and drives the ear-forwarding chain 58. Also engaging the ear-forwarding chain 58 are idler sprockets 92, 93, and 94. The shaft 81 has secured to its outer end a sprocket 95 engaged by a chain 96, engaging in turn an idler sprocket 97, and a driving sprocket 98 secured upon a shaft 99. Also secured to the shaft 99 is the sprocket 47 engaging the rear end of the horizontal conveyor chain 45b and driving it. Also secured to the outer end of the shaft 81 is a sprocket 100 engaged by a chain 101, engaging in turn a sprocket 102 secured to a jack-shaft 103. Jack-shaft 103 has secured thereto a bevel gear 104 engaging a bevel gear 105 secured to the snapping roll 29 and driving it. The snapping roll 28 is driven by spur gears 106 and 107 secured respectively to the snapping rolls 29 and 28 and engaging one another.

A sprocket 108 is secured to the drive shaft 81 and is engaged by a sprocket chain 109, which engages an idler sprocket 110 and a drive sprocket 111 secured upon a transverse shaft 112. The transverse shaft 112 drives a sprocket 113 secured thereto, which, in turn, drives a sprocket chain 114, in turn driving a sprocket 115 secured to the husk conveyor 59. The transverse shaft 112 is connected through a universal joint 116 with a shaft 117, to which is secured a sprocket 118 engaged by a sprocket chain 119, in turn engaging a sprocket 120 secured upon a shaft 121. Secured to the shaft 121 is a crank 122 connected with a link 123 connected in turn with a bell-crank 124 pivoted at 125 and connected also with the reciprocating cutter 27. A bevel gear 126, secured upon the shaft 121, meshes with a bevel gear 127 secured to a vertical shaft 128. Secured to the vertical shaft 128 is a sprocket 129 engaged by a chain 130, in turn engaged by idler sprockets 131 and 132 and drive sprockets 133 and 134. The drive sprocket 133 is secured to a vertical shaft 135 to which is secured a sprocket 136. The sprocket 136 is engaged by a sprocket chain 137, in turn engaged by a sprocket 138 secured to a vertical shaft 139. A sprocket 140, secured to the shaft 139, engages and drives the short gathering chain 36. The sprocket 134 is secured to a shaft 141 to which is secured a sprocket 142 driving the lower chain 39. A sprocket 143, secured upon the shaft 141, engages and drives the lower chain 38. A sprocket 144, secured to the upper end of the vertical shaft 128, engages and drives the long gathering chain 37. The sprocket chain 85 engages a sprocket 145 secured to the auger 61 for shelled corn. A sprocket 146, also secured to the auger feed 61, drives the wagon elevator 63.

In operation, the tractor 10 and the harvester 26 are driven along a row of standing stalks, such as corn, with the row passing through the throat 32. The stalks are guided by the gathering chains 36 and 37 to the reciprocating cutter 27, which cuts the stalks. The butt ends of the cut stalks are engaged by the lower inclined chains 38 and 39 and are conveyed upwardly along the inclined bottom 40. After the cutting of the stalks, the long inclined gathering chain also serves as an elevating chain for the upper end of the stalks. The spring strips 41 and 43 serve to hold the stalks against the chains 37, 38, and 39, and the inclined bottom 40 is curved, as indicated at 147, to slope toward the chains 38 and 39 and to keep the butt ends adjacent these chains. The chains 38 and 39 are driven faster than the chain 37, so that the butt ends of the cut stalks move faster than the upper ends thereof, and the stalks become more nearly horizontal as they are moved upwardly and rearwardly. The upper portion of the stalks are disengaged from the upper end of the chain 37 by a protuberance 148 formed on the right side 34 of the throat 32 near the top thereof. The butt ends of the stalks are stripped from the lower chains 38 and 39 by a portion of the side 34 indicated by the reference character 149. This portion 149 is rearward of the inclined bottom 40 and extends somewhat to the left and beyond the chains 38 and 39 as viewed in Figure 3, so as to effect the disengagement of the butt ends of the stalks from these chains. This same portion 149 also serves as one side of a narrowing throat at one side of the snapping rolls 28 and 29, which throat serves to guide the butt ends of stalks into the snapping rolls 28 and 29. The other side of the narrowing throat is indicated by the reference character 150. As the stalks are disengaged from the chains 37, 38, and 39, they reach the top of the throat 32 and are thrust against the hood 55 so as to be moved transversely onto the horizontal conveyor 45. Since this conveyor is horizontal, the stalks themselves are horizontal and are moved butt ends first to the vertical snapping rolls 28 and 29. The narrowing throat formed by the portions 149 and 150 serves to confine the butt ends sufficiently to guide them in the space between the rolls 28 and 29. As the stalks are gripped by the rolls 28 and 29 and pulled through, the ears are snapped or pinched therefrom and fall onto the husking rolls 56 and 57. The snapping roll 28 is formed of smooth wood, and the snapping roll 29 is formed of rubber having a corrugated spiral. The effect of the spiral is to raise the stalks as they pass between the rolls 28 and 29 and to allow the ears snapped from the stalks to fall freely upon the husking rolls 56 and 57 without interference from the stalks. The snapped ears move along the husking rolls 56 and 57 with the aid of the ear-forwarding chain 58 and, after being husked, pass along the plate 64 onto the wagon elevator 63. The husks removed from the ears pass through the husking rolls 56 and 57 to the auger feed 59, by which they are moved outwardly and discharged at the free end 62 thereof at the outer side of the harvester 26. The auger feed 61 beneath receives the heavy shelled corn and conveys it to the wagon elevator 24. Rearward of the snapping rolls 28 and 29 is a grate 151 over which the stripped stalks pass and fall beneath onto the ground. Any shelled corn falling to the rear of the snapping rolls 28 and 29 as a result of the snapping operation falls through the grate 151 onto an inclined bottom 152 passing therealong to the auger feed 61, where it joins the shelled corn coming down from the husk conveyor 59. The trough-like structure 64ª is provided with openings 153, through which any shelled corn landing on the structure 64ª falls to the inclined bottom 152.

From the foregoing description it will be apparent that a new and novel harvester construction has been provided. The harvester is of the type that cuts standing stalks, such as corn stalks, and strips crops from the cut stalks. The stripping means takes the form of vertical snapping rolls having a space between them for the passage of stalks arranged so that the stalks may pass lengthwise along the horizontal conveyor which extends lengthwise of the harvester 26. Although the stripping means takes the form of vertical snapping rolls, this means need not necessarily take this exact form, for, in so far as the vertical direction of the stripping means and its ability to take stalks fed lengthwise along the feeding means extending thereto are concerned, the stripping means may be considered to comprise essentially a narrow space for the stripping of crops from cut stalks by the passage of the stalks through the narrow space, the narrow space extending at a substantial angle to the horizontal generally in a vertical plane extending generally in the direction of the stalks as they are fed to the stripping means and being formed of spaced complemental parts disposed opposite one another transversely of the vertical plane in which the narrow space extends. As this definition is applied to the snapping rolls 28 and 29, it will be seen that, though these rolls extend vertically, they may just as well extend merely approximately vertically, that is, at a substantial angle to the horizontal, and the space between them will therefore extend at a substantial angle to the horizontal and be in a vertical plane extending generally in the direction in which the stalks are fed along the horizontal conveyor 45. The rolls 28 and 29 are disposed in spaced relation transversely of this vertical plane in which direction the feeding extends and so constitute spaced complemental parts disposed opposite one another transversely of the vertical plane extending in the direction of feed of the cut stalks.

The intention is to limit the invention only within the scope of the appended claims.

What is claimed is:

1. In combination, a mobile supporting frame, means forming a narrow throat extending generally in a vertical plane for receiving standing stalks, means mounting the last-mentioned means on the frame, cutting means for cutting standing stalks received within the narrow throat, conveying means mounted in the side of the throat for elevating cut stalks from the cutting means, a generally horizontal conveyor at one side of the top of the throat for conveying cut stalks butt end first over itself, means mounting the conveyor on the frame, means forming a hood over the horizontal conveyor and the narrow throat for causing the cut stalks to be guided from the conveying means in the side of the throat to the horizontal conveyor, means mounting the hood on the frame, stripping means presenting a narrow space for the stripping of crops from cut stalks received from the horizontal conveyor by passage of the stalks through the narrow space, the narrow space extending at a substantial angle to the horizontal generally in a vertical plane extending generally in the direction of feeding of the cut stalks by the horizontal conveyor and being formed of spaced parts disposed opposite one another transversely of the vertical plane, and means mounting the stripping means on the frame.

2. In combination, a mobile supporting frame, cutting means for cutting standing stalks, means mounting the cutting means on the frame adjacent the ground, means forming a narrow throat extending generally vertically and forwardly, rearwardly, and upwardly from the cutting means for receiving standing stalks, means forming an inclined bottom extending upwardly and rearwardly from the cutting means for supporting the butt ends of the cut stalks, conveying means mounted in the side of the narrow throat for moving standing stalks into the throat to the cutting means and for moving cut stalks upwardly from the cutting means over the inclined bottom with the butt ends of the stalks moving faster than the other ends of the stalks, a horizontal conveyor positioned above the cutting means at the side of the throat for receiving cut stalks from the throat and conveying them butt end first on top of itself, means mounting the horizontal conveyor on the frame, stripping means presenting a narrow space for the stripping of crops from cut stalks received from the horizontal conveyor by passage of the stalks through the narrow space, the narrow space extending at a substantial angle to the horizontal generally in a vertical plane extending in the direction of feeding of the cut stalks by the horizontal conveyor and being formed of spaced parts disposed opposite one another transversely of the vertical plane, and means mounting the stripping means on the frame.

3. In combination, a mobile supporting frame, cutting means for cutting standing stalks, means mounting the cutting means on the frame adjacent the ground, means forming a narrow throat extending generally vertically and forwardly, rearwardly, and upwardly from the cutting means for receiving standing stalks, means forming an inclined bottom extending upwardly and rearwardly from the cutting means for supporting the butt ends of the cut stalks, conveying means mounted in the side of the narrow throat for moving standing stalks into the throat to the cutting means and for moving cut stalks upwardly from the cutting means over the inclined bottom with the butt ends of the stalks moving faster than the other ends of the stalks, a horizontal conveyor positioned above the cutting means at the side of the throat for receiving cut stalks from the throat and conveying them butt end first on top of itself, means mounting the horizontal conveyor on the frame, means forming a hood extending over the horizontal conveyor and the narrow throat for insuring movement of cut stalks from the narrow throat to the horizontal conveyor, means mounting the last-mentioned means on the frame, stripping means presenting a narrow space for the stripping of crops from cut stalks received from the horizontal conveyor by passage of the stalks through the narrow space, the narrow space extending at a substantial angle to the horizontal generally in a vertical plane extending generally in the direction of feeding of the cut stalks by the horizontal conveyor and being formed of spaced parts disposed opposite one another transversely of the vertical plane, and means mounting the stripping means on the frame.

4. In combination, a mobile supporting frame, cutting means for cutting standing stalks, means mounting the cutting means on the frame, means for feeding cut stalks from the cutting means, said means comprising a lower conveyor element, an upper conveyor element, and means for running the lower element faster than the upper element, means mounting the feeding means on the frame, stripping means presenting a narrow space for the stripping of crops from cut stalks received from the feeding means by passage of the stalks through the narrow space, the narrow space extending at a substantial angle to the horizontal generally in a vertical plane extending generally in the direction of feeding of the cut stalks by the feeding means and being formed of complemental spaced parts disposed opposite one another transversely of the vertical plane, and means mounting the feeding means on the frame.

5. In combination, a mobile supporting frame, cutting means for cutting standing stalks, means mounting the cutting means on the frame near the ground, means for feeding cut stalks butt end first from the cutting means, said means comprising a narrow gathering throat extending in a generally vertical plane forwardly, upwardly, and rearwardly of the cutting means, an upper inclined feeding element extending along one side of the throat from a point near the ground forward of the cutting means to a point generally above the cutting means, a lower inclined feeding element extending from near the cutting means to a point rearward of and above the cutting means, the elements feeding cut stalks upwardly and rearwardly from the cutting means, and a horizontal conveyor positioned above the cutting means and extending from a point near the top of the upper feeding element to a point near the top of the lower feeding element so as to be adapted to feed above itself cut stalks received from the feeding chains butt end first, means mounting the feeding means on the frame, stripping means presenting a narrow space for the stripping of crops from cut stalks received from the horizontal conveyor by passage of the stalks through the narrow space, the narrow space extending at a substantial angle to the horizontal generally in a vertical plane extending generally in the direction of feeding of the cut stalks by the horizontal conveyor and being formed of spaced parts disposed opposite one another transversely of the vertical plane, and means mounting the stripping means on the frame.

6. In combination, a tractor having a rear axle and a wheel thereon, a framework connected to the tractor for partial support thereon and extending outwardly around the wheel, an auxiliary supporting wheel for the framework positioned outward of the tractor wheel, a harvester positioned on the framework outside the tractor wheel line and comprising cutting means for cutting standing stalks, stripping means presenting a narrow space extending at a substantial angle to the horizontal for the stripping of crops from cut stalks by passage of the stalks therethrough, and means for feeding cut stalks from the cutting means to the stripping means, and means mounting the harvester on the framework.

7. In combination, a tractor having a rear axle and a wheel, a harvester connected at the side of the tractor and comprising cutting means positioned at the side of the tractor for cutting standing stalks of corn, stripping means presenting a narrow space extending at a substantial angle to the horizontal for the stripping of crops from cut stalks by passage of the stalks therethrough, means for feeding cut stalks to the stripping means, and husking means extending transversely of the tractor at the rear thereof, and means mounting the harvester on the tractor.

8. In combination, a tractor having an axle and a wheel thereon, a harvester comprising cutting means positioned outside of the wheel for cutting standing corn stalks, means positioned outside of the wheel for removing ears from cut stalks, means extending directly from the ear-removing means transversely of the tractor at the rear thereof for receiving ears directly from the ear-removing means and husking the ears, and means mounting the harvester on the tractor.

9. In combination, a tractor having an axle and a wheel thereon, a framework connected for support on the tractor at points on the tractor in front of the axle and to the rear thereof and extending outwardly and around the wheel, an auxiliary supporting wheel for the framework, a first unit comprising cutting means for standing corn stalks and conveying means for removing cut stalks from the cutting means, means for mounting the first unit on the framework for adjustment with respect thereto, a second unit comprising stripping means for removing ears from cut stalks received from the conveying means and husking means for removing husks from ears removed from cut stalks, and means mounting the second unit on the framework against movement with respect thereto.

10. In combination, a tractor having an axle and a wheel thereon, a framework connected for support on the tractor at points on the tractor in front of the axle and to the rear thereof and extending outwardly and around the wheel, an auxiliary supporting wheel for the framework, a first unit comprising cutting means positioned outside of and ahead of the tractor wheel for cutting standing stalks of corn and conveying means positioned outside of and alongside the wheel for conveying cut stalks from the cutting means, means mounting the first unit on the framework for adjustment with respect thereto, a second unit comprising stripping means positioned outside and rearward of the tractor wheel for removing ears from cut stalks received from the conveying means and husking means extending transversely of the tractor at the rear thereof from outside of the wheel to inward of the wheel for husking ears removed from the cut stalks, and means mounting the second unit on the framework against movement with respect thereto.

11. In combination, a mobile supporting frame, a pair of generally vertical rotatable rolls, means mounting the rolls on the frame, cutting means for cutting standing corn stalks, means mounting the cutting means on the frame, means for feeding the cut corn stalks butt end first generally horizontally to the rolls for enabling the rolls to remove ears from the stalks, and means mounting the feeding means on the supporting means.

12. In combination, a tractor having an axle, a harvester comprising means positioned rearward of the axle for stripping ears from corn stalks and means positioned between the axle and the stripping means for husking ears stripped by the stripping means, and means connecting the harvester to the tractor.

13. In combination, a tractor having an axle and a wheel thereon, a harvester comprising means positioned rearward of the axle and outward of the wheel for stripping ears from corn stalks and means positioned between the axle and stripping means for husking ears stripped by the stripping means, and means connecting the harvester to the tractor.

14. In combination, a tractor having an axle, a harvester comprising generally vertical stripping rolls positioned rearward of the axle and husking rolls extending transversely of the tractor across the rear thereof between the axle and the stripping rolls, and means connecting the harvester to the tractor.

15. In combination, a tractor having an axle and a wheel thereon, a harvester comprising generally vertical stripping rolls positioned rearward of the axle and outward of the wheel and husking rolls extending transversely of the tractor across the rear thereof between the axle and the stripping rolls, and means connecting the harvester to the tractor.

16. In combination, a tractor having an axle and a wheel thereon, a harvester comprising means positioned rearward of the axle and outward of the wheel for stripping ears from corn stalks, and means extending between the axle and the stripping means from outside of the wheel to within the wheel for husking ears stripped by the stripping means, and means connecting the harvester to the tractor.

17. In combination, a tractor having an axle, a harvester comprising means positioned at the side of the tractor for cutting standing corn stalks, generally vertical stripping rolls positioned rearward of the axle for removing ears from the cut corn stalks, and generally horizontal husking rolls extending transversely of the tractor across the rear thereof between the axle and the stripping rolls for husking ears removed by the stripping rolls, and means connecting the harvester to the tractor.

18. In combination, a tractor having an axle and a wheel thereon, a frame extending from within the wheel to outside of the wheel and partially supported on the tractor, an auxiliary supporting wheel partially supporting the frame, a first unit comprising means positioned forward of the axle and outside of the wheel for cutting standing corn stalks and means positioned outside of the tractor wheel for guiding cut corn stalks rearwardly from the cutting means, means mounting the first unit on the frame for adjustment with respect thereto, a second unit comprising means positioned rearward of the axle and outside of the wheel for removing ears from cut corn stalks, means positioned between the removing means and the axle and extending from a point directly adjacent the stripping means and outward of the wheel to within the wheel for receiving stripped ears directly from the stripping means and husking them, and means mounting the second unit on the frame against movement with respect thereto.

19. In combination, a supporting frame, means forming a narrow throat extending generally in a vertical plane for receiving cut stalks, means mounting the last-mentioned means on the frame, conveying means mounted in the side of the throat for elevating cut stalks, a generally horizontal conveyor at one side of the top of the throat for conveying over itself cut stalks butt ends first, and means mounting the conveyor on the frame.

20. In combination, a supporting frame, means forming a narrow throat extending generally in a vertical plane for receiving cut stalks, means mounting the last-mentioned means on the frame, conveying means mounted in the side of the throat for elevating cut stalks, a generally horizontal conveyor at one side of the top of the throat for conveying cut stalks butt ends first over itself, stripping means presenting a narrow space for the stripping of crops from cut stalks received from the horizontal conveyor by passage of the stalks through the narrow space, the narrow space extending at a substantial angle to the horizontal generally in a vertical plane extending generally in the direction of feeding of the cut stalks by the horizontal conveyor and being formed of spaced parts disposed opposite one another transversely of the vertical plane, and means mounting the stripping means on the frame.

21. In combination, a supporting frame, means forming a narrow throat extending generally in a vertical plane for receiving cut stalks, means mounting the last-mentioned means on the frame, conveying means mounted on the side of the throat for elevating the cut stalks, a generally horizontal conveyor at one side of the top of the throat for conveying cut stalks butt end first over itself, means mounting the conveyor on the frame, means forming a hood over the horizontal conveyor and the narrow throat for causing cut stalks to be guided from the throat to the conveyor, and means mounting the hood on the frame.

22. In combination, a mobile supporting frame, means forming a narrow throat extending generally in a vertical plane for receiving standing stalks, means mounting the last-mentioned means on the frame, cutting means for cutting standing stalks received within the narrow throat, conveying means mounted in the side of the throat for elevating cut stalks from the cutting means, a generally horizontal conveyor at one side of the top of the throat for conveying cut stalks butt end first over itself, means mounting the conveyor on the frame, means forming a hood over the horizontal conveyor and the narrow throat for causing the cut stalks to be guided from the conveying means in the side of the throat to the horizontal conveyor, and means mounting the hood on the frame.

23. In combination, a supporting frame, means forming a narrow throat extending generally vertically for receiving cut stalks generally vertically, means mounting the throat-forming means on the frame, means forming an inclined bottom for supporting the butt ends of the cut stalks, means mounting the bottom-forming means on the frame, conveying means mounted in the side of the throat for moving cut stalks upwardly through the throat with butt ends moving faster than the other ends of the stalks, a horizontal conveyor positioned at the side of the throat for receiving cut stalks from the throat and conveying them butt end first over itself, and means mounting the horizontal conveyor on the frame.

24. In combination, a mobile supporting frame, cutting means for cutting standing stalks, means mounting the cutting means on the frame adjacent the ground, means forming a narrow throat extending generally vertically and forwardly, rearwardly, and upwardly from the cutting means for receiving standing stalks, conveying means mounted in the side of the narrow throat for moving standing stalks into the throat to the cutting means and for moving cut stalks upwardly from the cutting means with the butt ends of the stalks moving faster than the other ends of the stalks, a horizontal conveyor positioned above the cutting means at the side of the throat for receiving cut stalks from the throat and conveying them butt end first on top of itself, and means mounting the horizontal conveyor on the frame.

25. In combination, a supporting frame, means forming a narrow throat extending generally vertically for receiving cut stalks generally vertically, means mounting the throat-forming means on the frame, means forming an inclined bottom for supporting the butt ends of the cut stalks, means mounting the bottom-forming means on the frame, conveying means mounted in the side of the throat for moving cut stalks upwardly through the throat with butt ends moving faster than the other ends of the stalks, a horizontal conveyor positioned at the side of the throat for receiving cut stalks from the throat and conveying them butt end first over itself, means mounting the horizontal conveyor on the frame, means forming a hood extending over the horizontal conveyor and the narrow throat for insuring moving of cut stalks from the narrow throat to the horizontal conveyor, and means mounting the last-mentioned means on the frame.

26. In combination, a mobile supporting frame, cutting means for cutting standing stalks, means mounting the cutting means on the frame adjacent the ground, means forming a narrow throat extending generally vertically and forwardly, rearwardly, and upwardly from the cutting means for receiving standing stalks, conveying means mounted in the side of the narrow throat for moving standing stalks into the throat to the cutting means and for moving cut stalks upwardly from the cutting means with the butt ends of the stalks moving faster than the other ends of the stalks, a horizontal conveyor positioned above the cutting means at the side of the throat for receiving cut stalks from the throat and conveying them butt end first on top of itself, means mounting the horizontal conveyor on the frame, means forming a hood extending over the horizontal conveyor and the narrow throat for insuring movement of cut stalks from the narrow throat to the horizontal conveyor, and means mounting the last-mentioned means on the frame.

27. In combination, a mobile supporting frame, cutting means for cutting standing stalks, means mounting the cutting means on the frame near the ground, means for feeding cut stalks butt end first from the cutting means, said means comprising a narrow gathering throat extending in a generally vertical plane forwardly, upwardly, and rearwardly of the cutting means, an upper inclined feeding element extending along one side of the throat from a point near the ground forward of the cutting means to a point generally above the cutting means, a lower inclined feeding element extending from near the cutting means to a point rearward of and above the cutting means, the elements feeding cut stalks upwardly and rearwardly from the cutting means, and a horizontal conveyor positioned above the cutting means and extending from a point near the top of the upper feeding element to a point near the top of the lower feeding element so as to be adapted to feed above itself cut stalks received from the feeding chains butt end first, and means mounting the feeding means on the frame.

28. In combination, a frame, generally vertically disposed rolls for removing ears from cut corn stalks by passage of the stalks between the rolls, means mounting the rolls on the frame, husking means extending generally horizontally from directly below the rolls for receiving ears directly from the rolls, means mounting the husking means on the frame, one roll having a spiral configuration to cause the corn stalks on passing between the rolls to move upwardly along the rolls and away from the husking means to permit a fall of corn ears to the husking means without interference from the stalks.

29. In combination, a supporting frame, means forming a narrow throat extending generally vertically for receiving cut stalks generally vertically, means mounting the throat-forming means on the frame, means on the frame forming an inclined bottom for supporting the butt ends of the cut stalks, spaced inclined conveying chains mounted on one side of said throat for moving stalks upwardly thereof, the lower chain being operated at a higher speed than the upper chain whereby the stalks are moved into a substantially horizontal position as they reach the upper ends of the chains, a horizontal conveyor positioned at the side of the throat opposite the conveying chains and near the upper ends thereof, and means projecting from the conveyor chain side of the throat for disengaging the stalks from the chains and for moving them laterally towards the horizontal conveyor.

30. In combination, a supporting frame, means forming a narrow throat extending generally vertically for receiving cut stalks generally vertically, means mounting the throat-forming means on the frame, means on the frame forming an inclined bottom for supporting the butt ends of the cut stalks, an upper inclined conveying chain and a lower inclined conveying chain mounted on one side of said throat for moving stalks upwardly thereof, the lower chain being operated at a higher speed than the upper chain whereby the stalks are moved into a substantially horizontal position as they reach the upper ends of the chains, a horizontal conveyor positioned at the side of the throat opposite the conveying chains, said conveyor extending longitudinally across and below the upper ends of both of the chains, and means projecting from the conveyor chain side of the throat for disengaging the stalks from the chains and for moving them laterally towards the horizontal conveyor.

31. In combination, a supporting frame, means forming a narrow throat extending generally vertically for receiving cut stalks generally vertically, means mounting the throat-forming means on the frame, means on the frame forming an inclined bottom for supporting the butt ends of the cut stalks, spaced inclined conveying chains mounted on one side of said throat for moving stalks upwardly thereof, means for urging the stalks against the conveyor chain side of said throat, the lower chain being operated at a higher speed than the upper chain whereby the stalks are moved into a substantially horizontal position as they reach the upper ends of the chains, a horizontal conveyor positioned at the side of the throat opposite the conveying chains and near the upper ends thereof, and means projecting from the conveyor chain side of the throat for disengaging the stalks from the chains and for moving them laterally towards the horizontal conveyor.

32. In combination, a supporting frame, means forming a narrow throat extending generally vertically for receiving cut stalks generally vertically, means mounting the throat-forming means on the frame, means on the frame forming an inclined bottom for supporting the butt ends of the cut stalks, spaced inclined conveying chains mounted on one side of said throat for moving stalks upwardly thereof, the lower chain being operated at a higher speed than the upper chain whereby the stalks are moved into a substantially horizontal position as they reach the upper ends of the chains, a horizontal conveyor positioned at the side of the throat opposite the conveying chains, said conveyor extending longitudinally across and below the upper ends of both of the chains, and means projecting from the conveyor chain side of the throat adjacent the upper end of one of the chains for moving the stalks laterally towards the horizontal conveyor.

ARNOLD E. W. JOHNSON.

REFERENCES CITED

The following references are of record in the file of this patent:

UNITED STATES PATENTS

| Number | Name | Date |
|---|---|---|
| 1,815,274 | Ronning et al. | July 21, 1931 |
| 2,335,942 | Hyman | Dec. 7, 1943 |
| 879,440 | McInturf | Feb. 18, 1908 |
| 966,029 | Lichty | Aug. 2, 1910 |
| 2,358,513 | Hyman | Sept. 19, 1944 |